(12) United States Patent
Löbig et al.

(10) Patent No.: US 8,089,980 B2
(45) Date of Patent: Jan. 3, 2012

(54) METHOD FOR PROTECTION SWITCHING OF GEOGRAPHICALLY SEPARATE SWITCHING SYSTEMS

(75) Inventors: Norbert Löbig, Darmstadt (DE); Jürgen Tegeler, Penzberg (DE)

(73) Assignee: Siemens Aktiengesellschaft, Munich (DE)

( * ) Notice: Subject to any disclaimer, the term of this patent is extended or adjusted under 35 U.S.C. 154(b) by 1131 days.

(21) Appl. No.: 10/582,589

(22) PCT Filed: Aug. 26, 2004

(86) PCT No.: PCT/EP2004/051925
§ 371 (c)(1),
(2), (4) Date: Jun. 9, 2006

(87) PCT Pub. No.: WO2005/057853
PCT Pub. Date: Jun. 23, 2005

(65) Prior Publication Data
US 2007/0140109 A1    Jun. 21, 2007

(30) Foreign Application Priority Data
Dec. 12, 2003  (DE) .................................. 103 58 344

(51) Int. Cl.
*H04B 7/212*    (2006.01)
*G01R 31/08*    (2006.01)
(52) U.S. Cl. ........................................ 370/442; 370/217
(58) Field of Classification Search ................ 370/442, 370/217, 219, 220
See application file for complete search history.

(56) References Cited

U.S. PATENT DOCUMENTS

| 5,473,599 | A | | 12/1995 | Li et al. |
| 5,835,696 | A | * | 11/1998 | Hess ................................ 714/10 |
| 5,974,114 | A | * | 10/1999 | Blum et al. ...................... 379/9 |
| 6,005,841 | A | * | 12/1999 | Kicklighter ................... 370/217 |
| 6,108,300 | A | | 8/2000 | Coile et al. |
| 6,173,411 | B1 | | 1/2001 | Hrist et al. |
| 7,023,795 | B1 | * | 4/2006 | Hwu ............................ 370/219 |
| 7,535,827 | B2 | * | 5/2009 | Rusmisel et al. ............. 370/219 |
| 2002/0007468 | A1 | * | 1/2002 | Kampe et al. ................... 714/4 |
| 2003/0033030 | A1 | | 2/2003 | Naismith et al. |
| 2003/0048746 | A1 | * | 3/2003 | Guess et al. .................. 370/219 |
| 2003/0097610 | A1 | | 5/2003 | Hofner |
| 2003/0152064 | A1 | * | 8/2003 | Khan et al. ..................... 370/352 |
| 2009/0219804 | A1 | * | 9/2009 | Cole et al. .................... 370/218 |

FOREIGN PATENT DOCUMENTS

CN    1321004 A    11/2001
EP    0 412 799 A2    2/1991

* cited by examiner

*Primary Examiner* — Derrick Ferris
*Assistant Examiner* — Angel Brockman

(57) ABSTRACT

A protocol is provided being executed with a redundancy of 1:1. As a result, an identical clone, with identical hardware, identical software and an identical data base, is allocated to each switching system to be protected, as a redundancy partner. Switching is carried out in a quick, secure and automatic manner by a superordinate, real-time enabled monitor which establishes communication with the switching systems which are arranged in pairs. In the event of communication loss with respect to the active communication system, real-time switching to the redundant switching system is carried out.

16 Claims, 1 Drawing Sheet

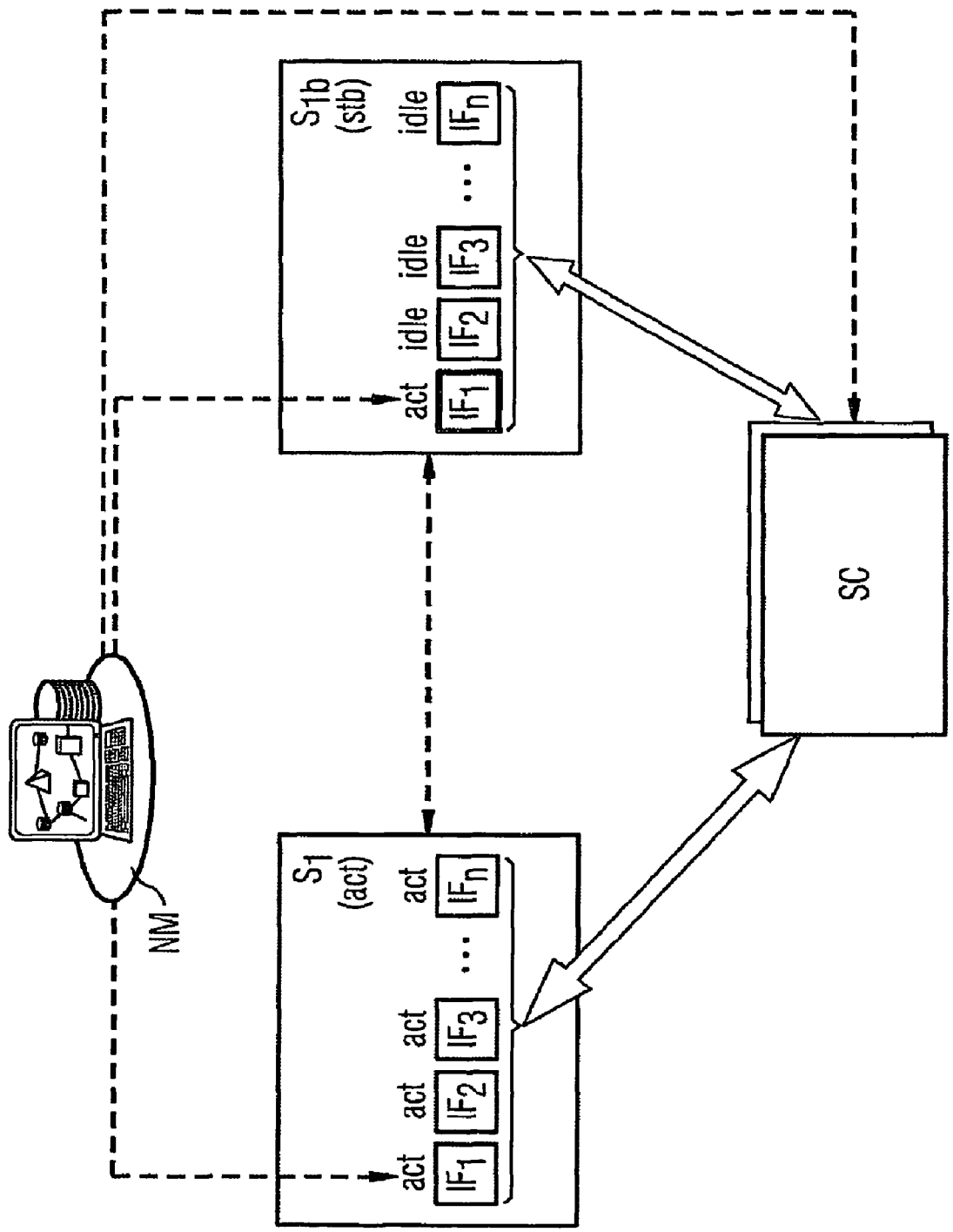

METHOD FOR PROTECTION SWITCHING OF GEOGRAPHICALLY SEPARATE SWITCHING SYSTEMS

CROSS REFERENCE TO RELATED APPLICATIONS

This application is the US National Stage of International Application No. PCT/EP2004/051925, filed Aug. 26, 2004 and claims the benefit thereof. The International Application claims the benefits of German application No. 10358344.0 DE filed Dec. 12, 2003, both of the applications are incorporated by reference herein in their entirety.

FIELD OF INVENTION

The present invention relates to a method for protection switching of geographically separate switching systems.

BACKGROUND OF INVENTION

Contemporary switching systems (switches) possess a high degree of internal operational reliability owing to the redundant provision of important internal components. This means that a very high level of availability of the switching-oriented functions is achieved in normal operation. If, however, external influencing factors occur on a massive scale (e.g. fire, natural disasters, terrorist attacks, consequences of war, etc.), the precautionary measures taken to increase operational reliability are generally of little use, since the original and replacement components of the switching system are located at the same place and so in a disaster scenario of said kind there is a high probability that both components have been destroyed or rendered incapable of operation.

SUMMARY OF INVENTION

A 1:1 redundancy has been proposed as a solution. Accordingly it is provided to assign each switching system requiring protection an identical clone as a redundancy partner having identical hardware, software and database. The clone is in the powered-up state, but is nonetheless not active in terms of switching functions. Both switching systems are controlled by a realtime-capable monitor, ranked at a higher level in the network hierarchy, which controls the switchover operations.

An object underlying the invention is to specify a method for protection switching of switching systems which ensures an efficient switchover of a failed switching system to a redundancy partner in the event of a fault.

According to the invention a protocol is proposed which is executed between a higher-level realtime-capable monitor and the active switching system on the one side, and the hot-standby switching system on the other side. The protocol is based on the standard IP protocols BOOTP/DHCP which are usually supported by every IP implementation. This solution can therefore be implemented in any switching system with IP-based interfaces with minimal implementation overhead. The solution is comprehensively deployable and cost-effective, because essentially only the outlay for the monitor is incurred. Furthermore, it is extremely robust thanks to the use of simple, standardized IP protocols. Control errors due to temporary outages in the IP core network are rectified automatically after the outage has been terminated. A dual monitor failure likewise represents no problem in this variant.

A significant advantage of the invention is to be seen in the fact that in the course of the switchover operation from an active switching system to a hot-standby switching system no network management and no form of central control unit to support the switchover operations are required in the participating switching systems. To that extent it is irrelevant whether the switching system has a central control unit or not. This means that the invention is also applicable to routers, which—in contrast to the traditional switching system—generally have no central control unit of said kind.

BRIEF DESCRIPTION OF THE DRAWING

The invention is explained in more detail below with reference to a schematically represented exemplary embodiment. According to the invention it is provided to assign each switching system requiring protection (e.g. $S_1$) an identical clone as a redundancy partner (e.g. $S_{1b}$) with identical hardware, software and database. The clone is in the powered-up state, but is nonetheless not active in terms of switching functions ("hot standby" operating state). In this way a highly available 1:1 redundancy of switching systems distributed over a plurality of locations is defined.

DETAILED DESCRIPTION OF INVENTION

The two switching systems (switching system $S_1$ and the clone or redundancy partner $S_{1b}$) are controlled by a network management system NM. The control is implemented in such a way that the current status of the database and the software of the two switching systems $S_1$, $S_{1b}$ is kept identical. This is achieved in that every operation-oriented command, every configuration command and every software update including patches is delivered in identical fashion to both partners. In this way a physically remote clone identical to a switch that is in operation is defined with identical database and identical software revision level.

The database basically contains all semi-permanent and permanent data. In this context permanent data is understood to mean the data which is stored as code in tables and which can only be changed by means of a patch or software update. Semi-permanent data refers to the data which enters the system e.g. via the user interface and which is stored there for a relatively long period in the form of the input. Except for the configuration statuses of the system, this data is generally not modified by the system itself. The database does not contain the transient data accompanying a call, which data the switching system stores only temporarily and which generally has no significance beyond the duration of a call, or status information which consists of transient overlays/supplements to configuratively predetermined basic states. (For example, although a port could be active in the basic state, it may not be accessible at the present time due to a transient (transitory) fault).

In addition, the switching systems $S_1$, $S_{1b}$ both have at least one active, packet-oriented interface to the common network management system NM. According to the present exemplary embodiment these are to be the two interfaces $IF_1$. In this case the two interfaces $IF_1$ assume an active operating state ("act"). However, whereas in the case of switching system S1 all the remaining packet-oriented interfaces $IF_2 \ldots IF_n$ are also active, in the case of switching system $S_{1b}$, in contrast, the remaining interfaces are in the operating state "idle". The state "idle" means that the interfaces permit no exchange of messages, but can be activated from an external point, i.e. by a higher-level, realtime-capable monitor located outside of switching system $S_1$ and switching system $S_{1b}$. The monitor can be implemented in hardware or software and in the event of a fault switches over in real time to the clone. Real time, in this case, means a time span of 1 to 2 seconds. According to the present exemplary embodiment the monitor is embodied as control device SC and duplicated for security reasons (local redundancy).

The interfaces $I_n$ are packet-based and so represent communication interfaces to packet-based peripheral devices (such as e.g. IAD, MG, SIP proxy devices), remote packet-based switches, packet-based media servers. They are controlled indirectly by the monitor which is embodied as a control device SC (Switch Controller). This means that the control device SC can activate and deactivate the interfaces $IF_n$ and therefore switch back and forth at will between the operating states "act" and "idle".

The configuration according to the figure is to be regarded as a default configuration. This means that switching system $S_1$ is active in terms of switching functions, while switching system $S_{1b}$ is in a "hot standby" operating state. This state is characterized by an up-to-date database and full activity of all components except for the packet-based interfaces (and possibly the processing of switching-oriented events). The (geographically redundant) switching system $S_{1b}$ can therefore be switched over quickly (in real time) by the control device SC into the active state in terms of switching-oriented functions by activation of the interfaces $IF_2 \ldots IF_n$. The interface $IF_1$ is also active on the hot standby switching system, because it describes the interface to the network management, which interface must always be active.

It is to be regarded as a significant aspect that the two geographically redundant switching systems $S_1$, $S_{1b}$ as well as the network management NM and the duplicated control device SC must each be clearly separated geographically.

The control device SC transmits the current operating state of the switching systems $S_1$ and $S_{1b}$ (act/hot-standby, status of the interfaces) as well as its own operating state to the network management NM s. The functions of the control device SC can optionally be performed partially or in full by the network management NM. For security reasons the network management NM should have the functionality to be able also to effect the above described switchovers manually. Optionally, the automatic switchover can be blocked so that the switchover can only be performed manually.

The switching systems $S_1$ and $S_{1b}$ can also perform their own regular checks to determine whether their packet-based interfaces are active. If this is not the case for the interfaces $IF_2 \ldots IF_n$, it can be concluded that they are in the "hot standby" state and certain alarms which are produced as a result of the non-availability of the interfaces $IF_2 \ldots IF_n$ can be selectively blocked. The transition of a switch from "hot standby" to "active" can also be detected in this way. This enables targeted measures to be taken if necessary at the start of the switching operations.

The packet addresses (IP addresses) of the interfaces $I_{2 \ldots n}$ of switching system $S_1$ and their respective partner interfaces of switching system $S_{1b}$ can be identical, but do not have to be. If they are identical, the switchover is noticed only by the front-end router. For the partner application in the network, on the other hand, it is completely transparent. This is a new application and generalization of the IP failover function. If the protocol which serves an interface permits a switchover of the communication partner to a different packet address, as is the case, for example, with the H.248 protocol (a media gateway can independently establish a new connection to another media gateway controller with a different IP address), the IP addresses can also be different.

In an embodiment of the invention it is provided to use the central computer of a further switching system as the control device SC. As a result there then exists a control device with maximum availability.

In a development of the invention consideration is given to the establishment of a direct communication interface between switching system $S_1$ and switching system $S_{1b}$. This can be used for updating the database e.g. with regard to SCI (Subscriber Controlled Input) and charge data as well as for exchanging transient data of individual connections or important further transient data (e.g. H.248 Association Handle). In this way the disruptions to operation can be minimized from the subscriber and operator perspective. The semi-permanent and transient data can then be transferred from the respective active switching system into the redundant hot-standby switching system in a cyclical time frame (update). The update of the SCI data has the advantage that the cyclical restore on the hot-standby system is avoided and SCI data in the hot-standby system is always up-to-date. As a result of the update of stack-relevant data, such as the H.248 Association Handle, the takeover by a standby system can be hidden from the peripherals and the downtimes can be reduced even more considerably.

Essentially, the IP addresses of all network components must be known in the network. The allocation of the IP addresses is controlled when the entire IP network device is powered up. For this purpose there is provided in the network a server (BOOTP server) which communicates via a BOOTP protocol with the clients that are to be powered up. At startup the network components (client), such as, for example, the switching systems $S_1$, $S_{1b}$, request the IP addresses from the BOOTP server with the aid of the BOOTP protocol. Once these IP addresses have been received, the respective component's own MAC address (network-wide hardware address) and own IP address are thus known in all network components. Since this assignment is not yet known in the network, this information is communicated by the network components to other network components (client, router) in the course of a broadcast message. A separate protocol (ARP protocol, Address Resolution Protocol) is used for this purpose.

According to the invention a protocol, referred to in the following as the HSCB protocol (HSCB: Hot-Standby Control Protocol), is proposed for monitoring and for switching over from an active switching system to a redundantly arranged switching system. Said HSCB protocol is executed between the control device SC and the switching system $S_1$ as well as between the control device SC and the switching system $S_{1b}$. It is essential that the protocol is able to bring the switching system $S_1$ into an active ("act") or a "hot standby" operating state after startup (recovery). In addition the switching system in the active (and optionally also the system in the "hot standby") operating state has to be monitored and the necessary switchovers have to be initiated in the event of a fault (active switching system goes to hot-standby/hot-standby switching system goes to active). Optionally, it can be explicitly communicated to switching systems $S_1$ and $S_{1b}$ whether they are in the active or hot-standby state.

The following rules are specified in the HSCB protocol between the control device SC and the switching system $S_1$ or, as the case may be, $S_{1b}$:

If a packet-based interface of a switching system is in the operating state "IDLE", it sends IP address requests ("BOOTP request") to the control device SC at regular intervals. In this case it is not necessary for the control device SC to answer these BOOTP requests of the interfaces of the switching system: this is done only for the address requests from the switching system that is identified as active to the control device SC. In the case of a positive response from the control device SC, the packet-based interface is placed into the active operating state ("act"). If there is no (or a negative)

response from the control device SC, the packet-based interfaces that are in the inactive operating state remain in the inactive operating state ("IDLE"). After the booting sequence all the packet-based interfaces are in the inactive operating state ("IDLE"). An interface in the active operating state does not need to send any address requests ("IP Request") to the control device SC.

The control device SC, for its part, sends monitoring messages at regular intervals to the packet-based interfaces, which must respond to these messages only if they are active. By means of a special message the control device SC can bring a packet-based interface from the active operating state into the inactive operating state ("IDLE").

The startup of the network configuration is described below. After startup, all the interfaces of switching systems $S_1$ and $S_{1b}$ are always in the inactive operating state "IDLE". The control device SC is now to be the BOOTP server for switching systems $S_1$ and $S_{1b}$. This means that at startup time the IP interfaces of switching system $S_1$ and/or switching system $S_{1b}$ fetch their IP addresses via BOOTP request from the control device SC. The control device SC is aware of the existence of both switching systems as well as of the operating state (act/hot-standby) still to be assumed by these. The control device SC implicitly communicates to the two switching systems $S_1$, $S_{1b}$ the operating state that they have to assume after startup. On the one hand this is effected for the switching system $S_{1b}$ that is to be defined as hot-standby in that the control device SC does not respond to the BOOTP requests of the interfaces $IF_2 \ldots IF_n$. Consequently, these interfaces have no IP addresses and remain in the inactive operating state ("IDLE"). However, they continue sending BOOTP requests at regular intervals to the control device SC, which in the normal state continues not to respond to these requests. On the other hand this is effected for the switching system $S_1$ that is to be defined as active in that the control device SC responds to all BOOTP requests (through communication of the IP address), as a result of which all interfaces are activated. DHCP requests can also be taken instead of BOOTP requests.

The system consisting of active switching system and clone thus assumes the state provided (in the control device SC), which is defined as the fault-free normal state. In this state the cyclical BOOTP requests of the interfaces of the clone continue not to be answered, as a result of which these also continue not to have their IP addresses. The active interfaces of switching system $S_1$ send no BOOTP requests. In this normal state the control device SC now sends monitoring messages cyclically to the interfaces of the active switching system, which messages have to be answered by the active interfaces. If this is the case, it can be assumed that the active switching system also continues to be in a fault-free operating state, as a result of which the active operating state is maintained. Since the cyclical BOOTP requests from the clone also continue to arrive (and also continue not to be answered), it can likewise be assumed that the clone too is in a fault-free operating state (still "IDLE", as previously). The control device SC has therefore stored the knowledge of the functional integrity of the active switching system and also of the clone. This knowledge is always kept at the latest level by means of the acknowledgement of the cyclical monitoring messages and the cyclical BOOTP requests of the clone.

In the scenario described below let a serious failure of switching system $S_1$ be assumed. Owing to the geographical redundancy there is a high probability that the clone (switching system $S_{1b}$), like the control device SC, is also unaffected. The failure of switching system $S_1$ is identified by the control device SC, which also controls the corresponding switchover operations to switching system $S_{1b}$:

The failure of switching system S1 is detected by the control device SC due to the fact that the monitoring messages are no longer acknowledged. However, a predefinable number of interfaces (configurable, optionally also all) should apply as the failure criterion, and not simply a loss of communication with all the interfaces. Thus, if no acknowledgements for this predefinable number of interfaces of switching system $S_1$ arrive at the control device SC for a relatively long period (e.g. 1 min.), it is concluded that a serious failure of switching system S1 has occurred. This criterion is sufficient to initiate a switchover from switching system $S_1$ to switching system $S_{1b}$.

In this case the control device SC initially places still active interfaces of switching system $S_1$ into the inactive operating state ("IDLE") with the aid of a special message. This message is embodied such that the interfaces of switching system $S_1$ are prompted to release their IP addresses. To be on the safe side, the message is supplied to all the interfaces of switching system $S_1$ (i.e. also to those that have failed) and cyclically repeated until the BOOTP requests from the now inactive interfaces arrive at the control device SC. Switching system $S_1$ is therefore in the inactive operating state.

The BOOTP requests still cyclically arriving as previously from $S_{1b}$ are now answered by the control device SC in that the interfaces of the hitherto inactive clone are notified of their IP addresses. As a result switching system $S_{1b}$ assumes an active operating state. Switching system $S_{1b}$ is thus ready for switching operation and can take over the functions of switching system S1.

The advantage of this approach lies in the avoidance of the "split brain" scenario. The interfaces of switching system $S_1$ are to remain in the inactive operating state even after the recovery of switching system $S_1$. Switching system $S_1$ is therefore deactivated in terms of switching functions until the next switchover. In order to keep the time interval of inconsistent interface states in switching system $S_{1b}$ as short as possible, the requests could be triggered in switching system $S_{1b}$.

Several failure scenarios are discussed below:

For the solution according to the invention, a total failure of the control device SC (dual failure of the two halves) represents no problem, in particular since such a case is extremely unlikely. In this embodiment variant this does not disrupt normal switching operation. Only the automatic switchover function of the control device SC is no longer present. Should a switchover become necessary during this time, it can be performed manually by the network management NM.

Similarly, a disruption to the communication between switching system $S_1$ and control device SC can be intercepted. In this case there is a very small probability that the "split brain" scenario can occur. This means that the two switching systems $S_1$, $S_{1b}$ simultaneously assume an active operating state and both also use the same IP addresses.

In order to rule out this complete scenario it is proposed to introduce a mutual monitoring for act/stb between switching system $S_1$ and switching system $S_{1b}$. The monitoring can use the same mechanisms as described above. Thus, for example, a dedicated IP interface of switching system $S_{1b}$ (hot standby) can send BOOTP requests to its partner interfaces in switching system $S_1$ at regular intervals and monitor whether its partner interface is active. If switching system $S_{1b}$ is now to go from hot-standby to active, a check can first be carried out to determine whether the partner interface has failed (i.e. is no longer sending any responses). If it is still active (which must not be the case if the switchover has been performed correctly and would lead to the "split brain"), the switchover stb->act in switching system $S_{1b}$ is prevented—and consequently also the "split brain". In this case there is a high probability that switching system $S_1$ is still active.

If a "split brain" scenario should still nonetheless occur at some point, there is still a simple possibility of correction from the network management NM side. According to this, one of the two switching systems is once again placed into the stb operating state and if necessary executes a recovery The invention is claimed:

1. A method for protection switching of geographically separate switching systems arranged in pairs, comprising:
providing a pair of switching systems which are geographically separate and which supply a dedicated redundancy to each other, one of the pair of switching systems is in an active operating state and the other is in a hot-standby operating state;
controlling the communication between the each of the pair switching system and a monitoring unit in accordance with the an operating state of the respective switching system;
when a loss of the communication to the switching system in the active operating state occurs:
activating, by the monitoring unit, the switching system in the hot-standby operating state to be in the active operating state, and deactivating, by the monitoring unit, the switching system with the communication loss to be in the hot-standby operating state, wherein when in the hot-standby operating state, the respective switching system is not active in terms of switching functions; and further features: periodically sending an IP lease request to the monitoring unit by a packet-based interface of the switching system in the hot-standby operating state, the packet-based interface is in an inactive state.

2. The method as claimed in claim 1, wherein an operating state selected from the group consisting of active operating state and hot-standby state has a pre-definable number of packet-based interfaces.

3. The method as claimed in claim 1, wherein the monitoring unit does not respond to the request while the switching system is in the hot-standby operating state.

4. The method as claimed in claim 1, further comprising changing the packet-based interface from the inactive state to an active state in response to receiving an IP lease response.

5. The method as claimed in claim 4, wherein the IP lease response from the monitoring unit contains an IP address leased to the requesting packet-based interface.

6. The method as claimed in claim 1, further comprising suppressing an sending IP lease request to the monitoring unit by a packet-based interface of the switching system in the active operating state, the packet-based interface is in an active operating state.

7. The method as claimed in claim 1, further comprising:
receiving a monitoring message from the monitoring unit by a packet-based interface of the switching system in the active operating state, the packet-based interface is in an active state; and
acknowledging the message by the packet-based interface.

8. The method as claimed in claim 7, further comprising:
determining, by the monitoring unit, a fault condition when an acknowledgement is not received from the packet-based interface in the active state; and
sending a IP lease response to a packet-based interface, which is inactive, of the switching system in the hot-standby operating state.

9. The method as claimed in claim 8, further comprising changing the packet-based interface from the inactive state to an active state in response to receiving the IP response.

10. The method as claimed in claim 1,
wherein the operating state of the switching system having the communication loss changes to a hot-standby operation state and remains defined as the hot-standby switching system until a new fault situation forces a new switchover.

11. A method for protection switching of geographically separate switching systems arranged in pairs, comprising:
providing a pair of switching systems which are geographically separate and which supply a dedicated redundancy to each other, one of the pair of switching systems is in an active operating state and the other is in a hot-standby operating state, each of the pair of switching systems comprises a database which is identical to each other, the database comprises only permanent data and semi-permanent data such that transient data pertaining to calls is excluded;
controlling the communication between the each of the pair switching system and a monitoring unit in accordance with the an operating state of the respective switching system;
when a loss of the communication to the switching system in the active operating state occurs:
activating, by the monitoring unit, the switching system in the hot-standby operating state to be in the active operating state, and
deactivating, by the monitoring unit, the switching system with the communication loss to be in the hot-standby operating state, wherein when in the hot-standby operating state, the respective switching system is not active in terms of switching functions; and further features: periodically sending an IP lease request to the monitoring unit by a packet-based interface of the switching system in the hot-standby operating state, the packet-based interface is in an inactive state; and ignoring the IP lease request by the monitoring unit while the switching system is in the hot-standby operating state.

12. The method as claimed in claim 11, further comprising changing the packet-based interface from the inactive state to an active state in response to receiving an IP lease response, the IP lease response from the monitoring unit contains an IP address leased to the requesting packet-based interface.

13. The method as claimed in claim 11, further comprising:
receiving a monitoring message from the monitoring unit by a packet-based interface of the switching system in the active operating state, the packet-based interface in an active state;
sending a response by the switching system in the active operating state via the packet-based interface to the monitoring message in order to acknowledge the monitoring message;
determining by the monitoring unit a fault condition when an acknowledgement is not received from the packet-based interface in the active state; and
sending a IP lease response to a packet-based interface, which is inactive, of the switching system in the hot-standby operating state.

14. A method for protection switching of geographically separate switching systems arranged in pairs, comprising:
providing a pair of switching systems which are geographically separate and which supply a dedicated redundancy to each other, the pair of switching systems comprise software identical to each other, one of the pair of switching systems is in an active operating state and the other is in a hot-standby operating state;

providing a monitoring unit that communicates with the pair of switching systems; controlling the communication between the each of the pair switching system and a monitoring unit in accordance with the an operating state of the respective switching system;

when a loss of the communication to the switching system in the active operating state occurs:

activating, by the monitoring unit, the switching system in the hot-standby operating state to be in the active operating state, and deactivating, by the monitoring unit, the switching system with the communication loss to be in the hot-standby operating state, wherein every software update including patches is delivered in identical fashion to the first and redundant switching system, and wherein when in the hot-standby operating state, the respective switching system is not active in terms of switching functions; and further features: periodically sending an IP lease request to the monitoring unit by a packet-based interface of the switching system in the hot-standby operating state, the packet-based interface is in an inactive state; and ignoring the IP lease request by the monitoring unit while the switching system is in the hot-standby operating state.

15. The method as claimed in claim 14, further comprising changing the packet-based interface from the inactive state to an active state in response to receiving an IP lease response, the IP lease response from the monitoring unit contains an IP address leased to the requesting packet-based interface.

16. The method as claimed in claim 14, further comprising:

receiving a monitoring message from the monitoring unit by a packet-based interface of the switching system in the active operating state, the packet-based interface in an active state;

sending a response by the switching system in the active operating state via the packet-based interface to the monitoring message in order to acknowledge the monitoring message;

determining by the monitoring unit a fault condition when an acknowledgement is not received from the packet-based interface in the active state; and sending a IP lease response to a packet-based interface, which is inactive, of the switching system in the hot-standby operating state.

* * * * *